United States Patent [19]

Pipper et al.

[11] Patent Number: 5,140,098
[45] Date of Patent: Aug. 18, 1992

[54] CONTINUOUS PREPARATION OF LINEAR HIGH MOLECULAR WEIGHT POLYAMIDES HAVING REGULATED AMINO AND CARBOXYL END GROUP CONTENT

[75] Inventors: Gunter Pipper, Bad Durkheim; Peter Hildenbrand, Karlsruhe; Wolfgang F. Mueller, Neustadt, all of Fed. Rep. of Germany

[73] Assignee: BASF Aktiengesellschaft, Ludwigshafen, Fed. Rep. of Germany

[21] Appl. No.: 729,787

[22] Filed: Jul. 10, 1991

Related U.S. Application Data

[63] Continuation-in-part of Ser. No. 580,859, Sep. 11, 1990, abandoned.

[30] Foreign Application Priority Data

Sep. 29, 1989 [DE] Fed. Rep. of Germany ....... 3932554

[51] Int. Cl.$^5$ ................................. C08G 69/48
[52] U.S. Cl. .................................. 525/420; 528/480; 528/483; 528/502; 528/503
[58] Field of Search ............... 525/420; 528/480, 483, 528/502, 503

[56] References Cited

U.S. PATENT DOCUMENTS 2,174,527 10/1939 Peterson ............................... 260/78
5,079,307 1/1992 Taylor et al. ....................... 528/335

OTHER PUBLICATIONS

Synthetische Fasern aus Polyamiden, Akademie-Verlag, Berlin 1963, 170, 194, 215.

*Primary Examiner*—Harold D. Anderson
*Attorney, Agent, or Firm*—Keil & Weinkauf

[57] ABSTRACT

Linear high molecular weight polyamides containing a regulated level of amino and carboxyl end groups are prepared in a continuous process by reacting polyamides in the melt with polyamide-forming diamines or dicarboxylic acids by continuous mixing for a residence time of ≦10 minutes, granulating the polyamide, and further condensing the polyamide granules thus obtained in solid phase in the presence of inert gases until the viscosity has reached the desired level.

10 Claims, No Drawings

CONTINUOUS PREPARATION OF LINEAR HIGH MOLECULAR WEIGHT POLYAMIDES HAVING REGULATED AMINO AND CARBOXYL END GROUP CONTENT

This application is a continuation-in-part of application Ser. No. 580,859, filed on Sept. 11, 1990, now abandoned.

The present invention relates to a process for the continuous preparation of linear polyamides containing a regulated amount of amino and carboxyl end groups by reacting polyamides with dicarboxylic acids or diamines.

In the preparation of polyamides such as nylon 6 or nylon 66, the viscosity and the end group content are influenced by the addition of chain regulators. Klare, Synthetische Fasern aus Polyamiden, Akademieverlag Berlin, 1963, pages 170, 194 and 215, discloses that not only monocarboxylic acids and monoamines but also dicarboxylic acids or diamines are used as chain regulators and that they are added to the polymerization batch. This procedure is disadvantageous with continuous processes, since the reaction time lengthens with increased levels of chain regulator and a rapid switch in end group setting is associated with a long tail. Furthermore, a not inconsiderable proportion of the diamines, for example, evaporates in the course of the distillative removal of the water from the polycondensation, and this leads to variability in quality. In addition, diamines tend to form triamines, which, being trifunctional compounds, lead to crosslinking and the formation of gels, which strongly impairs the quality of the polyamide, in particular in respect of fiber manufacture.

It is true that U.S. Pat. No. 2,174,527 already discloses that chain regulators, including inter alia dicarboxylic acids and diamines, can be added before the polymerization, during the polymerization or to the ready-produced polyamide and the condensation is then continued in the melt. This process has hitherto not become established in industry, since postcondensation in the melt is associated with the aforementioned disadvantages.

It is an object of the present invention to provide linear polyamides which contain a uniform level of both amino and carboxyl end groups and in respect of which the end group content should be rapidly switchable as required without the expense of a long tail and disadvantages at the polycondensation stage. In addition, gel formation should ideally be avoided.

We have found that this object is achieved by a process for the continuous preparation of a linear polyamide having a regulated amino and carboxyl end group content by reacting a polyamide with a dicarboxylic acid or a diamine in the melt, comprising the steps of a) reacting a polyamide having a relative viscosity of 2.0 to 7.0 with a polyamide-forming diamine or dicarboxylic acid in the melt at a temperature not more than 50° C. above the melting point of the polyamide by continuous mixing over a residence time of $\leq 10$ min, b) converting the resulting polyamide into a solid granular product, and c) further condensing the resulting polyamide granules in the solid phase and in the presence of an inert gas at a temperature of from 130° C. to 20° C. below the melting point of the particular polyamide until the viscosity and the end group content have reached the desired levels.

The novel process has the advantage that linear polyamides are obtained continuously in a simple manner with a uniform level of both amino and carboxyl groups, the level being rapidly adjustable as required without loss of productive capacity and without a long tail. Furthermore, the novel process has the advantages of producing a product of uniform quality and of reducing gelling.

The preferred starting polyamides are linear polyamides based on alkanedicarboxylic acids of from 6 to 12 carbon atoms, in particular of from 6 to 10 carbon atoms, in particular straight-chain $\alpha,\omega$-alkanedicarboxylic acids of the stated number of carbon atoms, also terephthalic acid and isophthalic acid. Of particular importance are adipic acid, sebacic acid, terephthalic acid and isophthalic acid. Such polyamides are also based on diamines of from 4 to 15 carbon atoms, advantageously alkanediamines of from 4 to 12 carbon 5 atoms, in particular straight-chain $\alpha,\omega$-diamines of the stated number of carbon atoms. Other suitable diamines are 4,4'-diaminodicyclohexylmethane and 2,2-(4,4'-diamino)dicyclohexylpropane. Suitable straight-chain diamines are for example hexamethylenediamine and octamethylenediamine. The former has attained particular industrial importance.

Other preferred polyamines are based on lactams of from 7 to 13 ring members such as caprolactam or laurolactam. Particular industrial importance has been attained by polycaprolactam. It is also possible to use copolymers of the abovementioned diamines and dicarboxylic acids and the lactams mentioned.

The polyamides are obtainable by polycondensation of the starting materials at polyamide-forming temperatures, for example 220–320° C. Advantageously, the polycondensation is carried out without the use of chain regulators, such as amines or carboxylic acids. It is also advantageous to feed the molten polyamide product directly into stage a).

The polyamides used have a relative viscosity of 2.0 to 7.0, in particular from 2.3 to 5.0. The relative viscosity was measured in a 1% by weight solution of the polyamide in 96% by weight of sulfuric acid at a temperature of 25° C. The molecular weights of the polyamides usually are in the range of from 10.000 to 50.000 g/mol. In general, they have an amino and carboxyl end group content from 40 to 140 eq./t.

Of particular industrial importance are nylon 6, nylon 66 and the polyamides formed from adipic acid, hexamethylene diamine and terephthalic acid or adipic acid, hexamethylenediamine and isophthalic acid.

In stage a of the process according to the present invention, the aforementioned polyamides are reacted with polyamide-forming diamines or dicarboxylic acids in the melt at a temperature of not more than 50° C. above the melting point of the particular polyamide by continuous mixing over a residence time of $\leq 10$ min.

Preferred diamines are aliphatic or cycloaliphatic primary diamines of from 6 to 15 carbon atoms which, apart from the amino groups, have a hydrocarbon structure, in particular alkanediamines of from 6 to 12 carbon atoms, advantageously of from 6 to 10 carbon 5 atoms, in particular straight-chain $\alpha,\omega$-diamines of the stated number of carbon atoms, such as hexamethylenediamine and octamethylenediamine. It is also possible to use 4,4'-diaminodicyclohexylmethane and 2,2-(4,4'-diamino)dicyclohexylpropane. Particular preference is given to hexamethylenediamine.

Preferred dicarboxylic acids are alkanedicarboxylic acids of from 6 to 12, in particular from 6 to 10, carbon atoms, in particular straight-chain α,ω-dicarboxylic acids of the stated number of carbon atoms, terephthalic acid and isophthalic acid. Particular preference is given to adipic acid, terephthalic acid and isophthalic acid.

It is convenient to use diamines or dicarboxylic acids already present as building blocks in the polyamide. It will be readily understood that dicarboxylic acids will be used when the carboxyl end group content is to be increased and alternatively diamines if the level of amino end groups is to be increased. Polyamides having an increased level of carboxyl groups are particularly suitable for example for reinforcement with glass fibers, while polyamides having an increased amino end group content have on account of their improved dyeability become important for fiber purposes.

In general, dicarboxylic acids or diamines are added in an amount of from 0.1 to 2, in particular from 0.1 to 1.5, % by weight, based on polyamide. The amount depends on the level of carboxyl or amino end groups to be achieved and on the relative viscosity of the polyamide used. Reaction with dicarboxylic acids increases the carboxyl end group content of the polyamide and reaction with diamines the amino end group content, and in either case it reduces the relative viscosity of the polyamide.

The reaction is carried out in the melt at a temperature of not more than 50° C. above the melting point of the particular polyamide and advantageously not more than 30° C. above the melting point of the particular polyamide.

The reaction is carried out with continuous mixing, for example in an extruder, in particular an extruder with positive conveyance, or static mixers. The reaction is carried out within a residence time of ≦10 min, for example within 0.5-5 min, in particular 0 5-3 min, especially 0.5-2 min.

In general, additives such as reinforcing agents, for example glass fibers or fillers, and also stabilizers or color pigments are added at the same time in effective amounts.

The polyamide thus obtained is almost in a polyamide equilibrium with the end group total, the relative viscosity always being lower than that of the starting polyamide, but it should advantageously not be lower than 1.5, in particular 1.8.

In stage b, the liquid polyamide melt thus obtained is converted into a solid granular product. This is done for example by extruding the melt in strand form, cooling and granulating. Alternatively, the melt is hot-cut with cooling. The resulting granules generally have dimensions of from 1×1.5 to 3×4 mm.

The polyamide granules thus obtained are further condensed in stage c in the solid phase to the desired viscosity and the desired end group content and also dried. The temperature maintained at this stage is 130-20° C., in particular 150-20° C., below the melting point of the particular polyamide. Furthermore, the solid phase condensation is carried out in the presence of inert gases such as nitrogen or steam, in particular superheated steam. Advantageously, the solid phase condensation is carried out in a tower-shaped zone in which the granules move in a downward direction and inert gases, eg. in superheated steam, move in the upward direction. The residence time depends on the desired viscosity. If the polyamides contain caprolactam as a building block, it is particularly advantageous to carry out the solid phase condensation in the presence of superheated steam, since this brings about the simultaneous removal of monomers and oligomers which in turn are recoverable from the steam at the upper end of the condensation zone by distillation. On the other hand, it is also possible to extract such polyamides with water at elevated temperature after granulation and before the solid phase condensation.

Polyamides which are obtainable by the process of the present invention are suitable for manufacturing fibers and filaments and also for the manufacture of shaped articles by extrusion or injection molding. Polyamides having a high carboxyl end group content which additionally contain reinforcing agents such as glass fibers or silicate fillers are particularly suitable for manufacturing shaped articles.

The process according to the present invention is illustrated by the following Examples:

EXAMPLE 1

A molten nylon-6.6 having a relative viscosity of 3.34 and a carboxyl end group content of 49 eq./t and an amino end group content of 41 eq./t is mixed at 282° C. in an extruder with 0.25 % by weight of adipic acid, based on the nylon used, in the course of a residence time of 90 seconds, the mixture is cast in strand form, and the strands are granulated. The granular product thus obtained had a relative viscosity of 2.71, a carboxyl end group content of 86 eq./t and an amino end group content of 42 eq./t. The nylon-6.6 granules are then further condensed in the solid phase in countercurrent with superheated steam at 162° C. in the course of 8 hours. The product obtained is a polyamide having a relative viscosity of 2.81, a carboxyl end group content of 80 eq./t and an amino end group content of 39 eq./t.

EXAMPLES 2 to 4

Example 1 is repeated each time, except that the relative viscosity of the starting nylon and the amount of adipic acid added are varied. Details are given below in Table 1.

TABLE 1

| Example | Nylon-6.6 $\eta_{rel}$ | end groups eq./t —COOH | —NH$_2$ | Amount of adipic acid added % by weight | Residence time sec | after extrusion $\eta_{rel}$ | end groups eq./t —COOH | —NH$_2$ | solid phase condensation Time [h] | Temp. [°C.] | after solid phase condensation $\eta_{rel}$ | —COOH | —NH$_2$ |
|---|---|---|---|---|---|---|---|---|---|---|---|---|---|
| 2 | 3.34 | 49 | 41 | 0.40 | 120 | 2.50 | 101 | 39 | 8 | 180 | 2.80 | 92 | 33 |
| 3 | 5.45 | 36 | 28 | 0.65 | 120 | 2.55 | 140 | 26 | 8 | 185 | 2.78 | 110 | 20 |
| 4 | 7.75 | 28 | 19 | 0.80 | 120 | 2.52 | 157 | 23 | 8 | 191 | 2.77 | 118 | 16 |

EXAMPLES 5, 6 and 7

Example 1 is repeated each time, except that hexamethylenediamine is used as additive. Details are given below in Table 2.

TABLE 2

| Example | Nylon-6.6 ηrel | Nylon-6.6 end groups eq./t —COOH | Nylon-6.6 end groups eq./t —NH₂ | Amount of HMD added % by weight | Residence time sec | after extrusion ηrel | after extrusion end groups eq./t —COOH | after extrusion end groups eq./t —NH₂ | solid phase condensation Time [h] | solid phase condensation Temp. [°C] | after solid phase condensation ηrel | after solid phase condensation —COOH | after solid phase condensation —NH₂ |
|---|---|---|---|---|---|---|---|---|---|---|---|---|---|
| 5 | 3.33 | 51 | 42 | 0.75 | 120 | 2.50 | 47 | 105 | 8 | 175 | 2.78 | 38 | 92 |
| 6 | 5.45 | 28 | 19 | 0.90 | 120 | 2.65 | 23 | 149 | 8 | 179 | 2.79 | 16 | 119 |
| 7 | 7.5 | 28 | 19 | 1.20 | 120 | 2.30 | 23 | 157 | 8 | 194 | 2.79 | 10 | 128 |

HMD = Hexamethylenediamine

EXAMPLES 8 to 11

A polycaprolactam melt is mixed and reacted with adipic acid in a static mixer at 275° C., the melt is then cast into strands, and the strands are cooled and granulated. The granules thus obtained are condensed in solid phase in countercurrent with superheated steam at 166–170° C. in the course of 8 hours. The details are given below in Table 3.

TABLE 3

| Example | End groups eq./t ηrel | End groups eq./t —COOH | End groups eq./t —NH₂ | Amount of AA added % by weight | Through-put kg/h | after extrusion μrel | after extrusion end groups eq./t —COOH | after extrusion end groups eq./t —NH₂ | Run | solid phase condensation Time [h] | solid phase condensation Temp. [°C] | after solid phase condensation ηrel | after solid phase condensation —COOH | after solid phase condensation —NH₂ |
|---|---|---|---|---|---|---|---|---|---|---|---|---|---|---|
| 8 | 2.66 | 60 | 38 | 0.32 | 30 | 2.46 | 92 | 35 | 8 | 8 | 170 | 2.72 | 79 | 21 |
| 9 | 2.68 | 61 | 41 | 0.32 | 30 | 2.48 | 90 | 38 | 9 | 8 | 167 | 2.76 | 78 | 22 |
| 10 | 2.68 | 61 | 41 | 0.32 | 40 | 2.50 | 97 | 34 | 10/11 | 8 | 166 | 2.77 | 79 | 22 |
| 11 | 2.68 | 61 | 41 | 0.32 | 50 | 2.52 | 98 | 35 | | 8 | 166 | 2.78 | 78 | 21 |

AA = Adipic acid

We claim:

1. A process for the continuous preparation of a linear polyamide having a regulated amino and carboxyl end group content, comprising the steps of
   a) reacting a polyamide having a relative viscosity of 2.0 to 7.0 measured in a 1% by weight solution of the polyamide in 96% by weight of sulfuric acid at a temperature of 25° C. with a polyamide-forming diamine in the melt at a temperature not more tan 50° C. above the melting point of the polyamide by continuous mixing over a residence time of ≦10 min,
   b) converting the resulting polyamide into a solid granular product, and
   c) further condensing the resulting polyamide granules in the solid phase and in the presence of an inert gas at a temperature of rom 130° C. to 20° C. below the melting point of the particular polyamide until the viscosity and the end group content have reached the desired levels.

2. A process for the continuous preparation of a linear polyamide having a regulated amino and carboxyl end group content, comprising the steps of
   a) reacting a polyamide having a relative viscosity of 2.0 to 7.0 measured in a 1% by weight solution of the polyamide in 96% by weight of sulfuric acid at a temperature of 25° C. with a polyamide-forming dicarboxylic acid in the melt at a temperature not more than 50° C. above the melting point of the polyamide by continuous mixing over a residence time of ≦10 min,
   b) converting the resulting polyamide into a solid granular product, and
   c) further condensing the resulting polyamide granules in the solid phase and in the presence of an inert gas at a temperature of from 130° C. to 20° C. below the melting point of the particular polyamide until the viscosity and the end group content have reached the desired levels.

3. A process as claimed in claim 1, wherein the amino end group content is adjusted with hexamethylene-diamine,. 2,2-(4,4'-diamino)dicyclohexylpropane or 4,4'-diaminodicyclohexylmethane.

4. A process as claimed in claim 2, wherein the carboxyl end group content is adjusted with adipic acid, sebacic acid, terephthalic acid or isophthalic acid.

5. The process of claim 1, wherein a diamine is added in an amount of from 0.1 to 2% by weight, based on polyamide.

6. The process of claim 1, wherein a dicarboxylic acid is added in an amount of from 0.1 to 2% by weight, based on polyamide.

7. The process of claim 1, wherein stage a comprises a residence time of 0.5 to 2 min.

8. The process of claim 2, wherein stage a comprises a residence time of 0.5 to 2 min.

9. The process of claim 7, wherein the condensation in solid phase comprises countercurrent with superheated steam.

10. The process of claim 2, wherein the condensation in solid phase comprises countercurrent with superheated steam.

* * * * *